(12) United States Patent
Ito

(10) Patent No.: US 10,406,733 B2
(45) Date of Patent: Sep. 10, 2019

(54) METHOD FOR MANUFACTURING DECORATIVE MOLDED ARTICLE

(71) Applicant: TOYODA GOSEI CO., LTD., Kiyosu-shi, Aichi-ken (JP)

(72) Inventor: Tatsuo Ito, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 203 days.

(21) Appl. No.: 15/064,644

(22) Filed: Mar. 9, 2016

(65) Prior Publication Data

US 2016/0318221 A1 Nov. 3, 2016

(30) Foreign Application Priority Data

Apr. 30, 2015 (JP) ................. 2015-092776

(51) Int. Cl.
| | | |
|---|---|---|
| B29C 45/14 | (2006.01) | |
| B29K 105/00 | (2006.01) | |
| B29K 105/20 | (2006.01) | |
| B29K 667/00 | (2006.01) | |
| B29L 31/00 | (2006.01) | |

(52) U.S. Cl.
CPC .. *B29C 45/14065* (2013.01); *B29C 45/14221* (2013.01); *B29C 45/14688* (2013.01); *B29C 45/14827* (2013.01); *B29C 2045/14155* (2013.01); *B29C 2045/14713* (2013.01); *B29K 2105/0067* (2013.01); *B29K 2105/20* (2013.01); *B29K 2667/003* (2013.01); *B29L 2031/722* (2013.01)

(58) Field of Classification Search
CPC .... B29C 45/14827; B29C 2045/14155; B29C 45/14065; B29C 2045/14713; B29L 2031/722

USPC .................................................. 264/511, 275
See application file for complete search history.

(56) References Cited

U.S. PATENT DOCUMENTS

2008/0251972 A1* 10/2008 Chang ................. B29C 45/1418
264/492

FOREIGN PATENT DOCUMENTS

| JP | 08-300405 A | 11/1996 | |
|---|---|---|---|
| JP | 09323326 A * | 12/1997 | ....... B29C 45/14221 |
| JP | 2001-198944 A | 7/2001 | |

(Continued)

OTHER PUBLICATIONS

English transaltion for JP2013203068 (Year: 2013).*

(Continued)

*Primary Examiner* — Joseph S Del Sole
*Assistant Examiner* — Mohamed K Ahmed Ali
(74) *Attorney, Agent, or Firm* — Posz Law Group, PLC

(57) ABSTRACT

A film in which a decorative design layer is formed on a base film is positioned and locked relative to a cavity mold while the mold is open. A pressing portion includes a tip portion made of a soft material. The tip portion pushes the film toward the cavity mold and presses the film against a portion of the molding surface. In this state, vacuum suction causes the film to stick to the molding surface. After that, an article body is molded by injecting molten plastic into the cavity while the mold is clamped. The obtained decorative molded article includes the decorative design layer that decorates the design surface of the article body by causing the decorative design layer of the film to stick to the design surface of the article body.

8 Claims, 6 Drawing Sheets

(56) References Cited

FOREIGN PATENT DOCUMENTS

| | | |
|---|---|---|
| JP | 2013-132826 A | 7/2013 |
| JP | 2013-146956 A | 8/2013 |
| JP | 2013-203068 A | 10/2013 |

OTHER PUBLICATIONS

English translation for JP2013132826 (Year: 2013).*
Office Action dated Apr. 17, 2018 issued in corresponding JP patent application No. 2015-092776 (and English translation thereof).

* cited by examiner

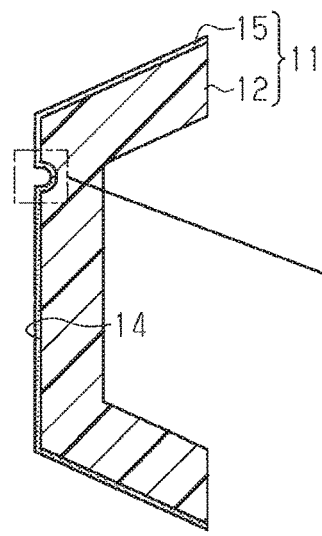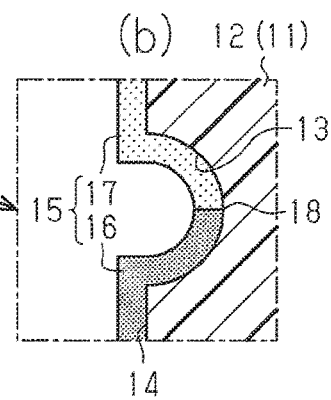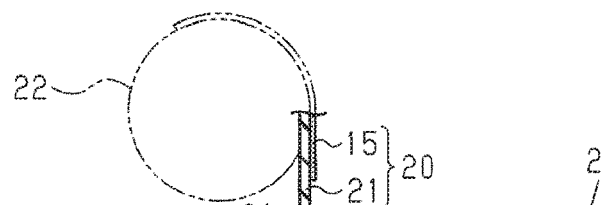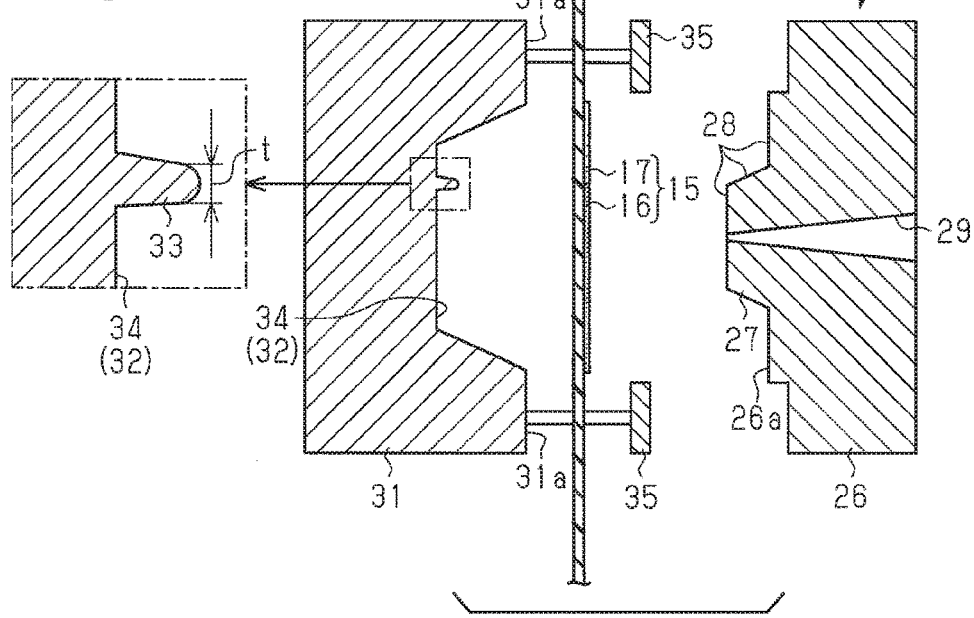

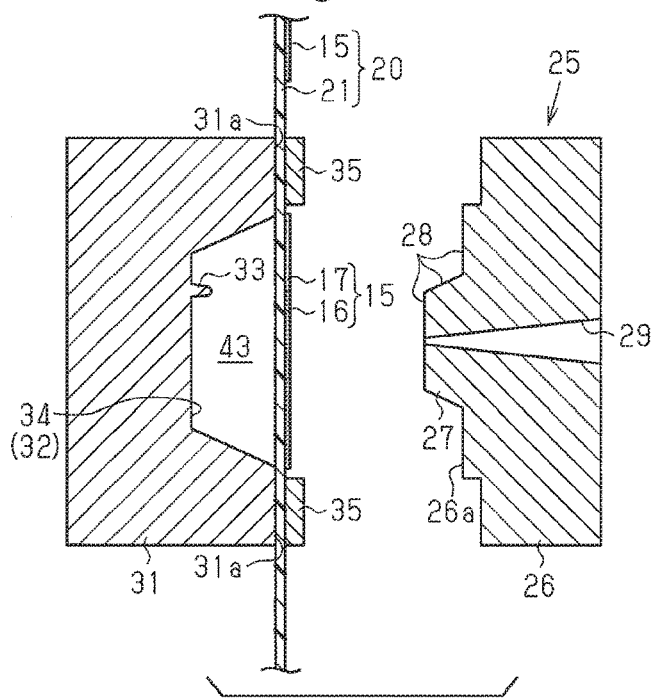
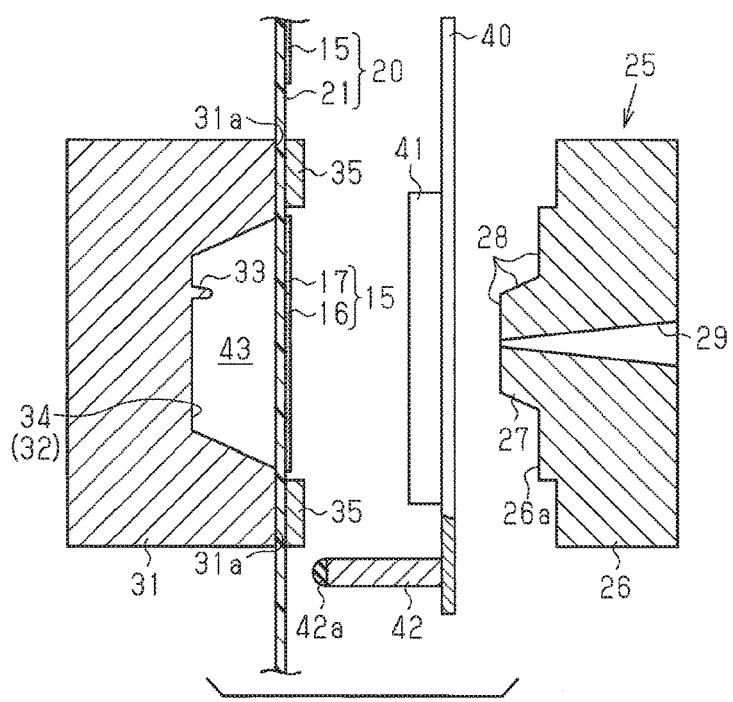

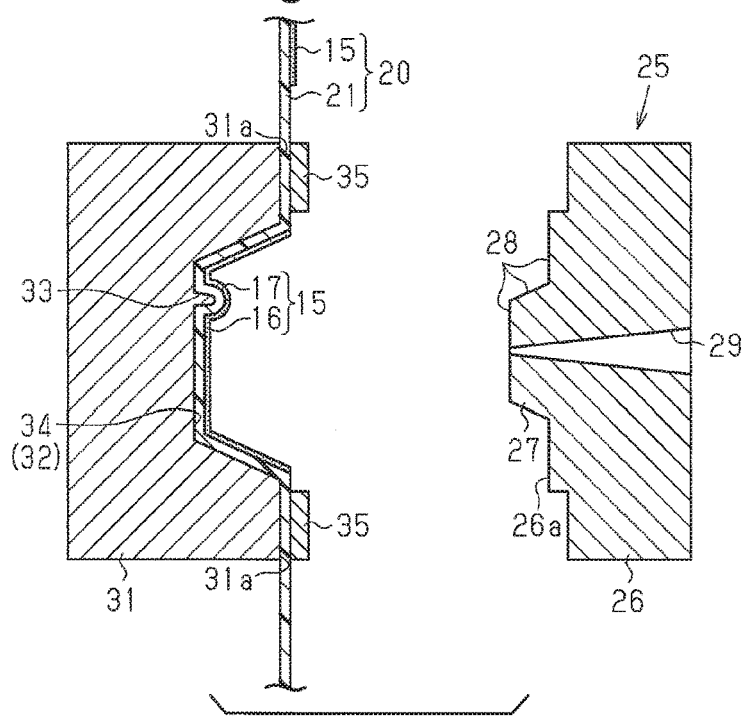
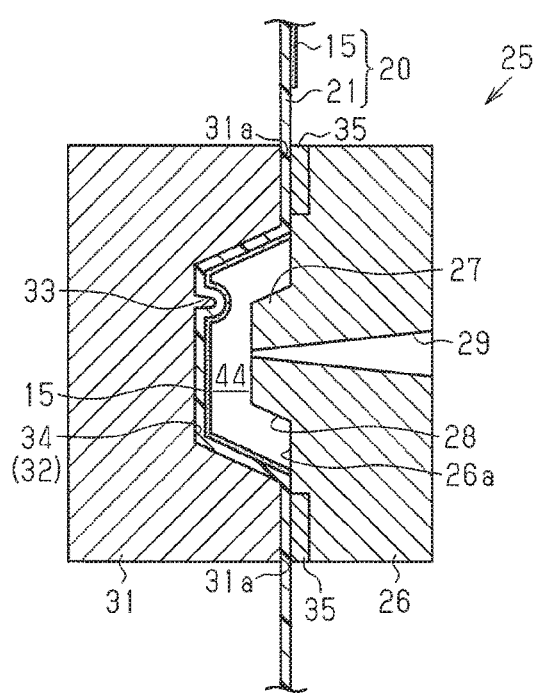

METHOD FOR MANUFACTURING DECORATIVE MOLDED ARTICLE

BACKGROUND OF THE INVENTION

The present invention relates to a method for manufacturing a decorative molded article of which a body has a design surface decorated with a decorative design layer.

A method called in-mold labeling is one of the methods for manufacturing a decorative molded article of which a body has a design surface decorated with a decorative design layer. For example, refer to Japanese Laid-Open Patent Publication No. 2013-146956. This manufacturing method uses a mold, which includes a cavity mold and a core mold, and a film in which a decorative design layer is formed on a base film. The film is positioned and locked on the cavity mold while the mold is open. Vacuum suction causes the film to stick to the molding surface of the cavity mold. After that, the article body is molded by injecting molten plastic into the cavity, which is defined between the film and the core surface of the core mold while the mold is clamped. In the molding process, the decorative design layer of the film is transferred (adheres) to the design surface of the article body. As a result, the obtained decorative molded article includes the decorative design layer decorating the design surface of the article body.

In the manufacturing method disclosed in the patent document, the film locked on the cavity mold moves closer to the molding surface by being pressed toward the cavity mold prior to vacuum suction. Thus, compared to a case in which vacuum suction is started instantly without decreasing the space between the film and the molding surface, the film moves by a smaller amount when vacuum suction is applied. The location of the decorative design layer relative to the molding surface is not easily affected by fluctuation in the temperature distribution of the film and fluctuation in the air flow in the vacuum space formed between the film and the molding surface. As a result, the obtained decorative molded article includes the decorative design layer formed with great positional accuracy.

However, in the manufacturing method disclosed in the patent document, the film may move and be misaligned before sticking to the molding surface since vacuum suction is applied to the film, which has been moved closer to the molding surface.

SUMMARY OF THE INVENTION

Accordingly, an objective of the present invention is to provide a method for manufacturing a decorative molded article that allows the decorative design layer to be formed with greater positional accuracy.

One aspect to achieve the above objective provides a method for manufacturing a decorative molded article of which an article body has a design surface decorated with a decorative design layer. The manufacturing method includes using a mold including a cavity mold and a core mold to position and lock a film relative to the cavity mold while the mold is open, wherein the film includes a base film on which a decorative design layer is formed, causing the film to stick to a molding surface of the cavity mold by vacuum suction, after that, molding the article body by injecting molten plastic into a cavity, which is defined between the film and a core surface of the core mold when the mold is clamped and causing the decorative design layer of the film to stick to the design surface of the article body, and prior to the vacuum suction, using a pressing portion, of which at least a tip portion is made of a soft material, to push the film locked to the cavity mold toward the cavity mold, thereby pressing the film against a portion of the molding surface with the tip portion of the pressing portion.

In the manufacturing method, the film is positioned and locked on the cavity mold while the mold is open when a decorative molded article is manufactured.

The film is then pushed by the tip portion of the pressing portion toward the cavity mold. Although the base film stretches, the film does not easily move relative to the pressing portion by being pushed by the pressing portion. This is the same in the decorative design layer. The decorative design layer does not easily move relative to the pressing portion.

As described above, the film stretches and moves closer to the molding surface while keeping its position relative to the pressing portion by being pushed by the pressing portion. The pushed portion of the film is pressed against a portion of the molding surface in the cavity mold. The cavity mold, against which the film is pressed, is made of metal and is hard, but the tip portion of the pressing portion, which pushes the film, is made of a soft material. Thus, pressing of the film against the molding surface is performed by elastically deforming the tip portion of the pressing portion. Accordingly, unlike the case in which the tip portion of the pressing portion is made of a hard material, the film, the cavity mold, and the pressing portion are not easily scratched.

As described above, vacuum suction is applied to the film, which is pressed against a portion of the molding surface. The vacuum suction causes the film to stick to the molding surface, and the film is shaped to conform to the shape of the molding surface. A portion of the film that is pressed against the molding surface by the pressing portion is restricted from moving from the location of the pressed portion. Thus, unlike the case in which vacuum suction is applied to the film, which is away from the molding surface, the film is less likely to move away from the pressed portion and be misaligned before the film sticks to the molding surface.

While the mold is clamped, the article body is molded by injecting molten plastic into the cavity defined between the film and the core surface of the core mold. In the molding process, heat and pressure of the molten plastic and the like cause the decorative design layer of the film to stick to the design surface of the article body with great positional accuracy.

BRIEF DESCRIPTION OF THE DRAWINGS

FIGS. 1A and 1B show one embodiment of a method for manufacturing a decorative molded article, where FIG. 1A is a cross-sectional view of the general structure of a decorative molded article that is manufactured using the manufacturing method, and FIG. 1B is a partially enlarged cross-sectional view of FIG. 1A;

FIG. 2A is a partial cross-sectional view of a mold and a film in the manufacturing process of a decorative molded article according to the embodiment;

FIG. 2B is a partially enlarged cross-sectional view of FIG. 2A;

FIGS. 3A and 3B are partial cross-sectional views of the mold and film in the manufacturing process of a decorative molded article according to the embodiment;

FIGS. 5A and 5B are partial cross-sectional views of the mold and film in the manufacturing process of a decorative molded article according to the embodiment;

DETAILED DESCRIPTION OF THE PREFERRED EMBODIMENTS

Figure 4:
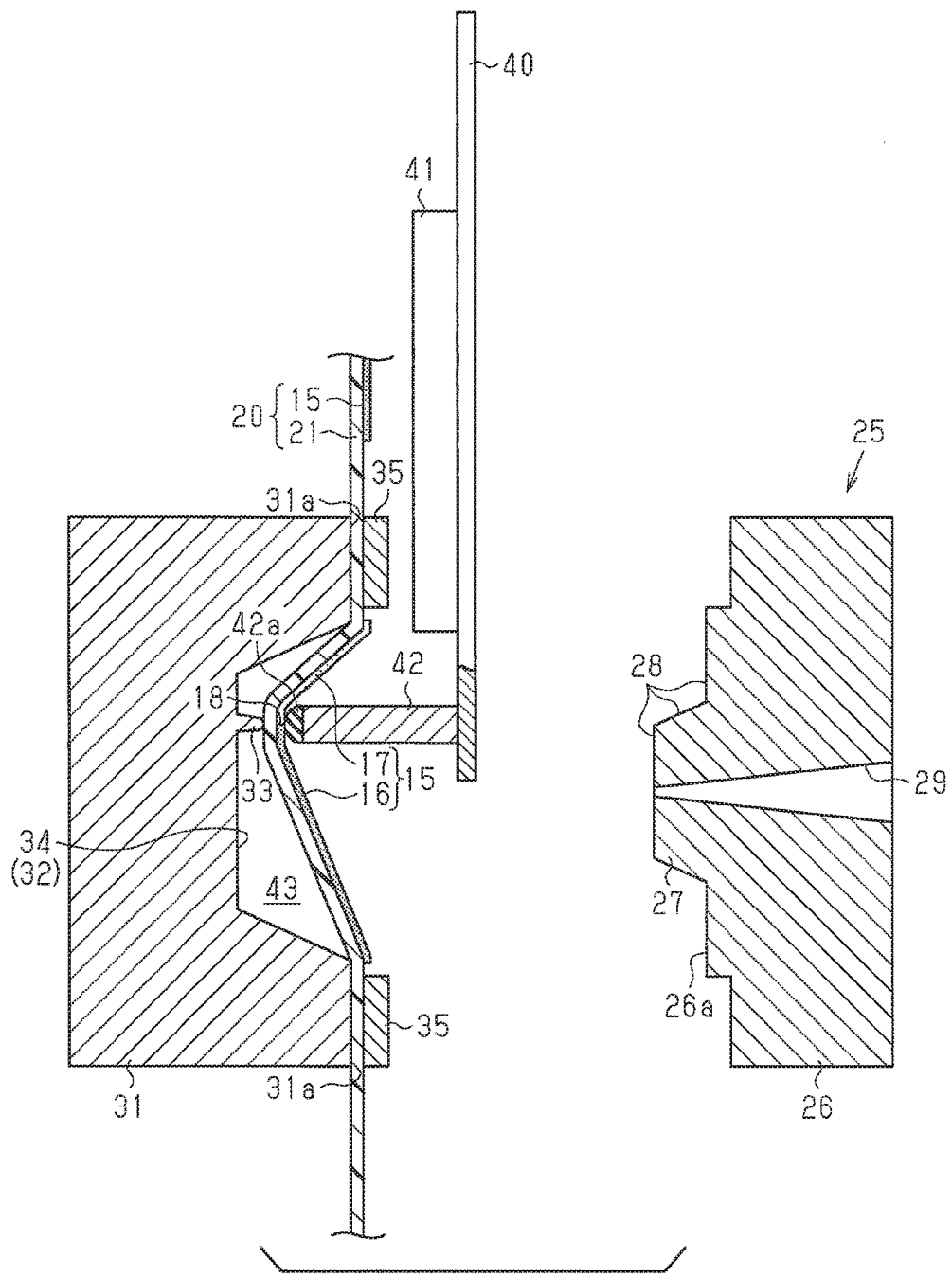
FIG. 4 is a partial cross-sectional view of the mold and film in the manufacturing process of a decorative molded article according to the embodiment.

A method for manufacturing a decorative molded article according to one embodiment will now be described with reference to the drawings.

The dimensional ratios in the drawings are exaggerated for illustrative purposes and are not actual ratios.

First, the general structure of a decorative molded article 11 obtained using the manufacturing method according to the present embodiment will be described. As shown in FIGS. 1A and 1B, the decorative molded article 11 is embodied, for example, as an interior part for vehicles. The decorative molded article 11 includes an article body 12 and a decorative design layer 15. The article body 12 is made of a plastic material using injection molding. The surface layer of the article body 12 includes a groove 13. At least a part of the groove 13 extends in a direction orthogonal to the sheet of FIGS. 1A and 1B. A part of the outer surface of the article body 12 constitutes a design surface 14. The inner wall surface of the groove 13 also constitutes a part of the design surface 14.

The decorative design layer 15 is formed on the design surface 14 of the article body 12 and decorates the design surface 14. The decorative design layer 15 includes adjacent two types of design portions 16 and 17, which contact each other. The decorative design layer 15 is formed substantially over the entire surface of the design surface 14 in the article body 12 while a boundary portion 18 between the design portions 16 and 17 is arranged on the inner wall surface of the groove 13.

The following film 20 and mold 25 are used for manufacturing the decorative molded article 11.

<Film 20>

As shown in FIG. 2A, a long base film 21 made of a plastic material constitutes the primary part of the film 20. The base film 21 may be transparent or opaque. Any thermoplastic material may be used as the plastic material of the base film 21. In the present embodiment, polyethyleneterephthalate (PET) is used as the plastic material. The base film 21 may be single-layered or may have a laminated structure.

Decorative design layers 15 are detachably formed on the base film 21 using printing such as gravure printing, vapor deposition, or the like. The decorative design layers 15 are arranged at predetermined intervals in the longitudinal direction of the base film 21. Each of the decorative design layers 15 includes design portions 16 and 17, which have, for example, a wood-grain pattern, a stone pattern, a sand pattern, a metallic pattern, a geometric pattern, an abstract pattern, and the like. The design portions 16 and 17 may include characters, symbols, and the like.

A mark for positioning (not shown) is printed or formed for each decorative design layer 15 at a different location from the decorative design layer 15 on the base film 21.

The film 20 is rolled up to form a roll 22 such that the base film 21 is inside and the decorative design layer 15 is outside.

<Mold 25>

The mold 25 includes a core mold 26 and a cavity mold 31. In the present embodiment, the cavity mold 31 is a faxed mold, and the core mold 26 is a movable mold. The core mold 26 moves in the horizontal direction and moves toward or away from the cavity mold 31.

A portion of the core mold 26 that is located on the side closer to the cavity mold 31 includes a molding protrusion 27, which protrudes toward the cavity mold 31. The core mold 26 includes an end surface 26a that is located on the side closer to the cavity mold 31. The surface of the molding protrusion 27 and a portion of the end surface 26a that is located around the molding protrusion 27 constitute a core surface 28. The core mold 26 includes a sprue gate 29, which has an open end on the front end surface of the molding protrusion 27.

In contrast, a portion of the cavity mold 31 that is located on the side closer to the core mold 26 includes a molding recess 32. A portion of the molding recess 32 includes a projection 33 for molding the groove 13 of the article body 12. The projection 33 extends toward the molding protrusion 27. At least a part of the projection 33 extends in a direction orthogonal to a sheet of FIGS. 2A and 2B. The tip of the projection 33 has a thickness t of about 1 mm. The inner wall surface of the molding recess 32 including the surface of the projection 33 constitutes a molding surface 34.

The molding surface 34 has a function as a shaping surface for shaping the film 20 into a predetermined shape and a function as a shaping surface for molding molten plastic into the article body 12 having a predetermined shape. The cavity mold 31 includes a number of fine vacuum suction holes (not shown) that are open in the molding surface 34. The vacuum suction holes are connected to a vacuum pump (not shown).

The cavity mold 31 is provided with an annular clamp 35. The cavity mold 31 is provided with a driving mechanism (not shown) for the clamp 35. The driving mechanism moves the clamp 35 between a clamp position (FIG. 3A) and a clamp releasing position (FIG. 2A). At the clamp position, the clamp 35 is close to the end surface 31a of the cavity mold 31, which is located on the side closer to the core mold 26. At the clamp releasing position, the clamp 35 is away from the end surface 31a toward the core mold 26.

As shown in FIGS. 3B and 4, a movable member 40, which is provided separately from the cavity mold 31 and the core mold 26, is arranged near the mold 25. The movable member 40 is movable in the vertical and horizontal directions. A heater 41, which generates heat when energized, is attached to the surface of the movable member 40 that is located on the side closer to the cavity mold 31. The purpose of the heater 41 is to facilitate stretching of the film 20 when the film 20 is pressed toward the cavity mold 31 and vacuum suction is applied to the film 20. The heater 41 softens the film 20 with heat immediately before the film 20 is pressed toward the cavity mold 31 or vacuum suction is applied to the film 20.

A pressing portion 42 is arranged at a different location from the heater 41 in the movable member 40 and extends toward the cavity mold 31. The pressing portion 42 has a shape corresponding to the projection 33 to allow the film 20 to be pressed against the projection 33 across the overall length of the projection 33. In other words, the pressing portion 42 is shaped such that the shape of the pressing portion 42 when seen from the side closer to the cavity mold 31 corresponds to the shape of the projection 33 when seen from the side closer to the core mold 26.

Figure 7A:
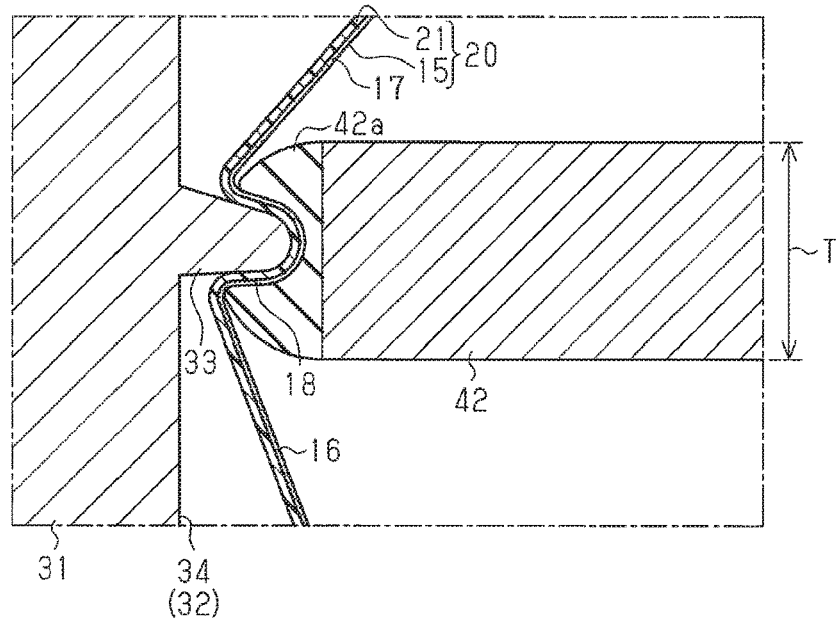
FIG. 7A is a partial cross-sectional view of the mold and film, illustrating a state in which the tip portion of a pressing portion formed of a soft material presses the film against a projection.

As shown in FIG. 7A, the pressing portion 42 has a thickness T that is greater than the thickness t of the projection 33 in the cavity mold 31 (refer to FIG. 2B). The pressing portion 42 used in the present embodiment has a thickness T of about 8 mm. Most of the pressing portion 42 is made of a hard material such as rigid plastic. The pressing portion 42 has a tip portion 42a, which is made of a soft material such as rubber. The surface of the tip portion 42a is curved. In view of mass production and the positional accuracy of the formed decorative design layer, the desirable rigidity of the soft material is 10° to 50° of Shore A hardness. More desirable rigidity of the soft material is 15° to 30° of Shore A hardness.

As shown in FIG. 2A, the roll 22 of the film 20 is arranged above the cavity mold 31. A winder (not shown) is arranged near the lower portion of the cavity mold 31 and winds the base film 21, from which the decorative design layer 15 is separated.

The method for manufacturing the decorative molded article 11 will now be described with reference to FIGS. 2 to 7.

As shown in FIG. 2A, the mold 25 is opened by moving the core mold 26 away from the cavity mold 31. The clamp 35 is held at the clamp releasing position.

In this state, operation of the winder feeds the film 20 from the roll 22 above the cavity mold 31 toward the area between the cavity mold 31 and the clamp 35. In the fed film 20, the base film 21 is located on the side closer to the cavity mold 31, and the decorative design layer 15 is located on the side closer to the core mold 26. Feeding of the film 20 is stopped when the decorative design layer 15 reaches a predetermined position. In other words, the decorative design layer 15 is positioned relative to the cavity mold 31. For example, a sensor detects a mark for positioning to position the decorative design layer 15.

While the mold 25 is held open, the clamp 35 is then moved to the clamp position as shown in FIG. 3A. This causes the clamp 35 to press the film 20 against the cavity mold 31. The film 20 is sealed and held around the molding surface 34 on the end surface 31a of the cavity mold 31 that is located on the side closer to the core mold 26. A sealed space 43 is formed between the molding surface 34 of the cavity mold 31 and the film 20.

While the mold 25 is held open, the movable member 40 is lowered as shown in FIG. 3B. The lowering movement continues until the heater 41 reaches the area between the film 20 and the molding protrusion 27 of the core mold 26. The energized heater 41 generates heat, and the film 20 is heated. With the heat, the film 20 is softened to facilitate stretching of the film 20.

After heating of the film 20, the movable member 40 is raised to a height at which the tip portion 42a of the pressing portion 42 faces the projection 33 in FIG. 3B. As shown in FIG. 4, the movable member 40 is then moved toward the cavity mold 31. This movement moves the pressing portion 42 toward the cavity mold 31. The tip portion 42a of the pressing portion 42 pushes the film 20 at the boundary portion 18 between the design portions 16 and 17 toward the cavity mold 31. Although the base film 21 stretches, the base film 21 does not easily move relative to the pressing portion 42 by being pushed by the pressing portion 42. This is the same in the decorative design layer 15. The boundary portion 18 of the decorative design layer 15 does not easily move relative to the pressing portion 42.

As described above, the pressing portion 42 pushes the film 20. This keeps the position of the film 20 relative to the pressing portion 42, while the film 20 stretches and moves closer to the molding surface 34. As shown in FIG. 4, the film 20 is pressed against a part (the projection 33) of the molding surface 34 in the cavity mold 31.

The cavity mold 31, against which the film 20 is pressed, is made of metal and is hard. In contrast, the tip portion 42a of the pressing portion 42, which presses the film 20, is made of a soft material. Thus, when the film 20 is pressed against the projection 33, the tip portion 42a is elastically deformed.

Figure 7B:
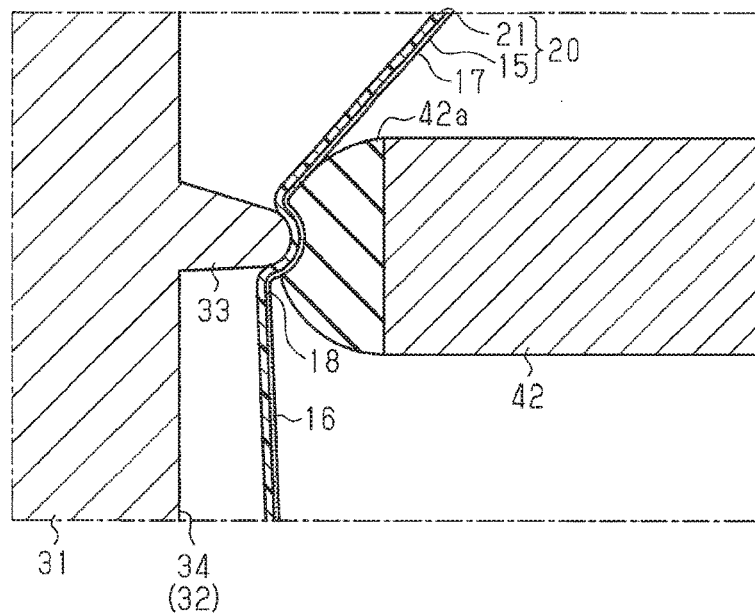
FIG. 7B is a partial cross-sectional view of the mold and film, illustrating a state in which the tip portion of a pressing portion formed of a soft material with a hardness different from the hardness of FIG. 7A presses the film against a projection.

To improve the positional accuracy when the decorative design layer 15 is formed, the tip portion 42a of the pressing portion 42 is preferably made of a soft material with lower rigidity for the following reason. FIGS. 7A and 7B show a state in which the tip portion 42a of the pressing portion 42 presses the film 20 against the projection 33. The difference between FIGS. 7A and 7B is that the tip portion 42a shown in FIG. 7A is made of a soft material with lower rigidity than the tip portion 42a shown in FIG. 7B.

As shown in FIG. 7B, the elastic deformation amount of the tip portion 42a is small when the tip portion 42a, which is made of a soft material with great rigidity, presses the film 20 against the projection 33. Thus, if the tip portion 42a does not press the boundary portion 18 between the design portions 16 and 17 against the projection 33, the vacuum suction applied after that moves the boundary portion 18 relative to the tip portion 42a. As a result, the boundary portion 18 may stick to the molding surface 34 at a location that is shifted from the projection 33.

In contrast, as shown in FIG. 7A, if the tip portion 42a is made of a soft material with low rigidity and presses the film 20 against the projection 33, the elastic deformation amount of the tip portion 42a is large. Thus, the elastically-deformed tip portion 42a presses the boundary portion 18 between the design portions 16 and 17. In particular, since the thickness T of the pressing portion 42 is greater than the thickness t of the projection 33, a portion of the elastically-deformed tip portion 42a that presses the boundary portion 18 has a large area. The boundary portion 18 is easily pressed against the projection 33 by the elastically-deformed tip portion 42a. Thus, even if vacuum suction is applied after that, the boundary portion 18 does not easily move relative to the tip portion 42a and sticks to the projection 33.

When a vacuum pump starts vacuum suction in the state shown in FIG. 4, the pressure of the sealed space 43 is decreased. With the decreased pressure, the film 20 is drawn toward the cavity mold 31 and stretches. As shown in FIG. 5A, the film 20 sticks to the molding surface 34 and is shaped to conform to the shape of the molding surface 34. Here, preparatory shaping of the film 20 is performed. As shown in FIG. 4, this limits movement of a portion of the film 20 at which the pressing portion 42 presses against the molding surface 34, i.e., the boundary portion 18 between the adjacent design portions 16 and 17. Thus, unlike the case in which the film 20 is simply moved toward the molding surface 34, i.e., a case in which the film 20 is not pressed against the molding surface 34 (refer to the previously cited patent document), it is less likely for the boundary portion 18 to move relative to the pressing portion 42 before the boundary portion 18 sticks to the molding surface 34. The location of the decorative design layer 15 relative to the molding surface 34 is not easily affected by fluctuation in the temperature distribution of the film 20 or fluctuation in the air flow in the sealed space 43.

To prepare for heating in the next cycle, the movable member 40 is withdrawn to a standby position outside the mold 25.

When the film 20 sticks to the molding surface 34 as shown in FIG. 5A, the mold 25 is clamped as shown in FIG. 5B. In the mold clamping, the core mold 26 is moved toward the cavity mold 31. The mold clamping forms a cavity 44 between a portion of the film 20 that sticks to the molding surface 34 of the cavity mold 31 and the core surface 28 of the core mold 26.

Figure 6A:
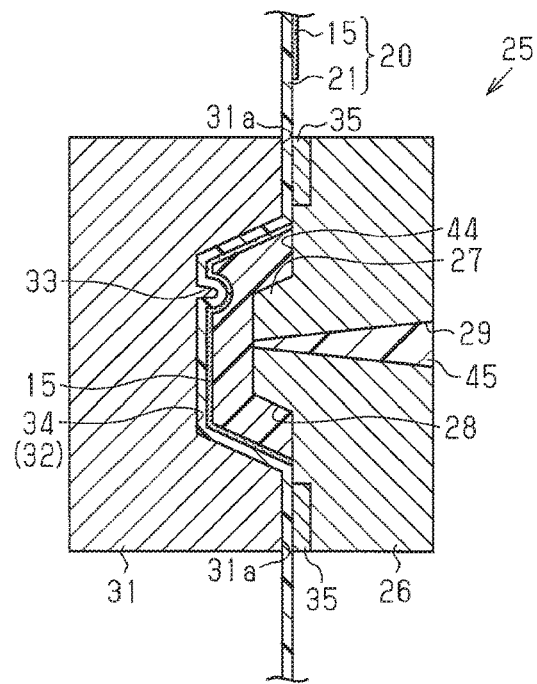
FIGS. 6A and 6B are partial cross-sectional views of the mold and film in the manufacturing process of a decorative molded article according to the embodiment.
Figure 6B:
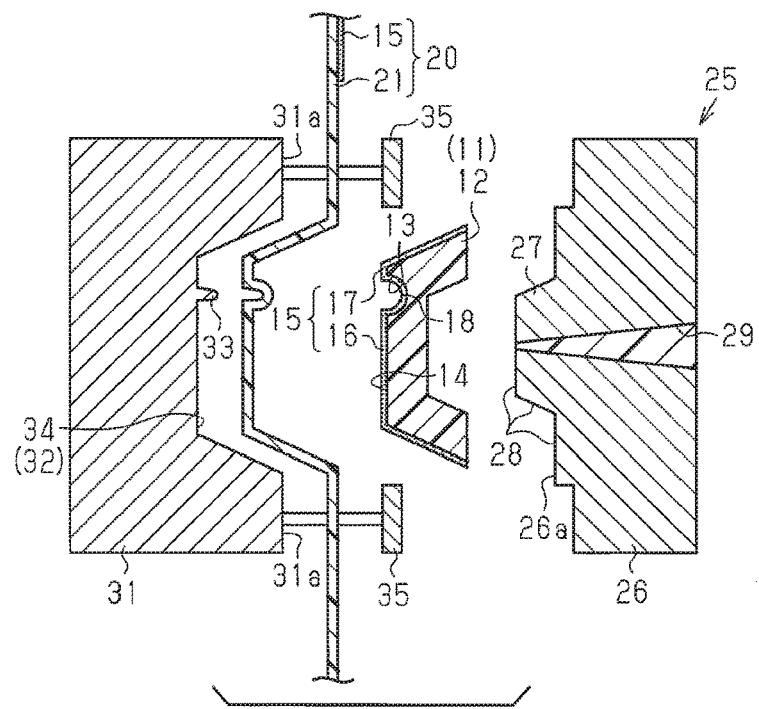

As shown in FIG. 6A, molten plastic 45 is injected into the cavity 44 through the sprue gate 29. After that, the molten plastic 45 is cooled to shape the article body 12 having the groove 13 as shown in FIG. 6B. In this shaping process, the decorative design layer 15 is separated from the base film 21 of the film 20 with the heat of the molten plastic 45, the pressure of injection, and the like. The decorative design layer 15 is transferred or adheres to the design surface 14 of the article body 12 with great positional accuracy such that the boundary portion 18 between the adjacent design portions 16 and 17 is located on the inner wall surface of the groove 13 in the article body 12, which is a predetermined location where the boundary portion 18 will be formed. With this transfer, the obtained decorative molded article 11 has the decorative design layer 15 formed with great positional accuracy on the design surface 14 of the article body 12.

The mold 25 is then opened by moving the core mold 26 away from the cavity mold 31 as shown in FIG. 6B. The decorative molded article 11 is extracted from the mold 25. To prepare for manufacturing a decorative molded article 11 in the next cycle, the clamp 35 is moved to the releasing position.

The winder (not shown), which is located below the cavity mold 31, winds the film 20 by a predetermined length, and a single cycle of manufacturing a decorative molded article finishes.

The above illustrated embodiment achieves the following advantages.

(1) Prior to vacuum suction, the tip portion 42a of the pressing portion 42 pushes the film 20, which is positioned and locked on the cavity mold 31, toward the cavity mold 31 and presses the film 20 against a portion of the molding surface 34, i.e., the projection 33 (FIG. 4).

Thus, compared to a conventional device that moves the film 20 closer to the molding surface 34 by pushing the film 20 toward the cavity 44 prior to vacuum suction (refer to the previously cited patent document), the moving amount of the film 20 is decreased at vacuum suction. This allows the decorative design layer 15 to be positioned more accurately. As a result, the obtained decorative molded article 11 provides greater texture than the conventional one.

(2) The tip portion 42a made of a soft material is used as the pressing portion 42, and the tip portion 42a presses the film 20 against a portion of the molding surface 34 in the cavity mold 31, i.e., the projection 33 (FIG. 4).

For this reason, unlike the case in which the tip portion 42a of the pressing portion 42 is made of a hard material, the elastically-deformed tip portion 42a reduces scratches on the film 20, the cavity mold 31, and the pressing portion 42.

Thus, even if the space between the pressing portion 42 and the molding surface 34 of the cavity mold 31 varies, the elastically-deformed tip portion 42a absorbs the variation.

(3) Two types of design portions 16 and 17 constitute the decorative design layer 15. Pressing of the film 20 by the tip portion 42a of the pressing portion 42 is performed at the boundary portion 18 between the design portions 16 and 17 (FIG. 4).

Thus, the decorative design layer 15 is transferred or adheres with great positional accuracy so that the boundary portion 18 between the design portions 16 and 17 is located at a predetermined location where the boundary portion 18 will be formed, i.e., at the groove 13, on the article body 12 during shaping of the article body 12.

(4) In the manufacturing method according to the present embodiment, an article to be manufactured is the decorative molded article 11, in which the groove 13 is formed on the surface layer and the boundary portion 18 between the design portions 16 and 17 is located on the inner wall surface of the groove 13. The tip portion 42a of the pressing portion 42 presses the film 20 at the boundary portion 18 against the projection 33 (FIG. 4).

This allows the decorative design layer 15 to be transferred or adhere to the article body 12 with great positional accuracy, so that the boundary portion 18 is located on the inner wall surface of the groove 13.

Thus, although different patterns lie next to each other in the boundary portion 18 between the design portions 16 and 17, the boundary portion 18 arranged on the inner wall surface of the groove 13 is unnoticeable compared to a case in which the boundary portion 18 is located at another location of the decorative molded article 11.

(5) The movable member 40 having the pressing portion 42 is used separately from the cavity mold 31 and the core mold 26 (FIGS. 3B and 4).

Thus, the tip portion 42a of the pressing portion 42 pushes the film 20 toward the cavity 44 and presses the film 20 against a portion of the molding surface 34, i.e., the projection 33, by moving the movable member 40 toward the cavity mold 31 while the mold 25 is open. Thus, advantage (1) is achieved.

(6) A film including a decorative design layer 15 detachably formed on a base film 21 is used as the film 20 (FIG. 2A). In the shaping process of the article body 12, the decorative design layer 15 is separated from the base film 21 and is transferred to the design surface 14 of the article body 12 (FIGS. 6A and 6B).

Thus, in the decorative molded article 11, in which only the decorative design layer 15 is transferred to the design surface 14 of the article body 12, advantage (1) is achieved.

(7) Before the tip portion 42a of the pressing portion 42 pushes the film 20 toward the cavity mold 31, the film 20 is heated by the heater 41 (FIG. 3B).

Thus, the heating softens the film 20 to facilitate stretching of the film 20. This is effective when the molding surface 34 of the cavity mold 31 is deep. In this case, deep drawing is necessary, and the film 20 needs to greatly stretch to stick to the molding surface 34.

(8) In shaping of the article body 12, the decorative design layer 15 is transferred (adheres) to the article body 12 (FIG. 6A).

Thus, after being shaped, the article body 12 does not need a decoration treatment such as coating on the design surface 14 of the article body 12. This reduces manufacturing costs.

(9) All manufacturing processes of the decorative molded article 11, including a preparatory shaping process of the film 20, are performed using the single mold 25 (FIGS. 2A to 6B).

Thus, the number of processes is reduced to improve efficiency compared to a case in which a decorative molded article is manufactured by preparing an article body, which is obtained by shaping the film 20, in advance, placing the article body in a mold, and injecting molten plastic to the back of the article body.

The above-illustrated embodiment is modified in the following forms.

<As to Pressing Portion 42>

The pressing portion 42 may be modified as long as at least the tip portion 42a is made of a soft material. Thus, in addition to the tip portion 42a, a portion of the pressing portion 42 other than the tip portion 42a may be made of a soft material.

Instead of the movable member 40, the pressing portion 42 may be provided in the core mold 26. In this case, the core mold 26 is moved toward the cavity mold 31 to clamp the mold 25, and the pressing portion 42 pushes the film 20, which is locked to the cavity mold 31, toward the cavity mold 31 and presses the film 20 against a portion of the molding surface 34 (the projection 33). After that, vacuum suction causes the film 20 to stick to the molding surface 34. The article body 12 is molded by injecting the molten plastic 45 into the cavity 44 while the mold 25 is clamped, and the decorative design layer 15 of the film 20 is transferred to the design surface 14 of the article body 12.

<As to Mold 25>

Contrary to the above-illustrated embodiment, the core mold 26 may be a fixed type, and the cavity mold 31 may be a movable type.

One of the cavity mold 31 and the core mold 26 may be a fixed type, and the other one may be a movable type that moves closer to or away from the fixed one by moving up and down.

In the cavity mold 31, a portion of the molding surface 34 against which the pressing portion 42 presses the film 20 may be different from the projection 33. The portion may be a flat portion of the molding surface 34. Basically, the portion may be any place as long as the portion can receive the film 20, which is pushed by the tip portion 42a of the pressing portion 42.

<As to Film 20>

The decorative design layer 15 may include one type of design portion or may include three or more types of design portions.

A film that includes the base film 21 made of a transparent plastic material (e.g., acrylic plastic) and the decorative design layer 15 adhering on the base film 21 may be used as the film 20.

In this case, in the shaping process of the article body 12, the decorative design layer 15 is formed on the design surface 14 of the article body 12, and a transparent plastic layer of the base film 21 is formed on the decorative design layer 15.

In this decorative molded article 11, the decorative design layer 15 and the article body 12 are covered and protected by the transparent layer.

<Others>

Although the above-illustrated method for manufacturing a decorative molded article is especially effective when the molding surface 34 of the cavity mold 31 is deep, the method is also applicable even when the molding surface 34 is shallow. In this case, heating treatment of the film 20 by the heater 41 may be omitted.

The application of the above-illustrated method for manufacturing a decorative molded article is not limited to interior parts for vehicles and is applicable to cases of manufacturing various types of plastic molded articles for vehicles.

Furthermore, the above-illustrated manufacturing method is applicable to various types of plastic molded articles in fields other than vehicles, e.g., appliance parts, general goods, and daily goods.

The invention claimed is:

1. A method for manufacturing a decorative molded article of which an article body has a design surface decorated with a decorative design layer, the manufacturing method comprising:

using a mold including a cavity mold and a core mold to position and locking a film relative to the cavity mold while the mold is open, wherein the film includes a base film on which a decorative design layer is formed, and wherein the cavity mold includes a molding surface and a projection located on the molding surface;

causing the film to stick to a molding surface of the cavity mold by vacuum suction;

after that, molding the article body by injecting molten plastic into a cavity, which is defined between the film and a core surface of the core mold when the mold is clamped and causing the decorative design layer of the film to stick to the design surface of the article body; and prior to the vacuum suction, using a pressing portion, of which at least a tip portion is made of a soft material, to push the film locked to the cavity mold toward the cavity mold, the pressing portion having a thickness greater than a thickness of the projection and the projection having a height from the molding surface equal to or greater than a height of the tip portion of the pressing portion, the pressing portion pressing the film against the projection on the molding surface with the tip portion of the pressing portion, wherein the pressing portion is provided with a movable member that is provided separately from the cavity mold and the core mold, and while the mold is open, the movable member is moved to push the film, with the tip portion of the pressing portion, toward the cavity mold.

2. The method for manufacturing a decorative molded article according to claim 1, wherein:

the decorative design layer includes a plurality of types of design portions, and pressing of the film with the tip portion of the pressing portion is performed at a boundary portion between adjacent design portions.

3. The method for manufacturing a decorative molded article according to claim 2, wherein:

an article to be manufactured is a decorative molded article in which a surface layer of the article body includes a groove and a boundary portion between adjacent design portions is located on an inner wall surface of the groove, and the manufacturing method comprising pressing the film, with the tip portion of the pressing portion, against the projection at the boundary portion between the adjacent design portions.

4. The method for manufacturing a decorative molded article according to claim 1, wherein, in the film, the decorative design layer is detachably formed on the base film, the manufacturing method comprising transferring the decorative design layer to the design surface of the article body from the base film in a molding process of the article body.

5. The method according to claim 1, wherein
the soft material of the tip portion has a Shore A hardness of 15° to 30°.

6. The method according to claim 1, wherein
locking the film relative to the cavity mold while the mold is open forms a sealed space between the molding surface of the cavity mold and the film,
the vacuum suction is applied to the sealed space between the molding surface of the cavity mold and the film, and
after causing the film to stick to the molding surface of the cavity mold and prior to injecting molten plastic into an area between the film and the cavity core, withdrawing the movable member to a position outside the mold.

7. A method for manufacturing a decorative molded article having an article body and a design surface decorated with a decorative design layer, the manufacturing method comprising:
providing a mold having a cavity mold and a core mold, the cavity mold having a molding surface and a projection located on the molding surface, and the core mold having a core surface;
while the mold is open, locking a film in position relative to the cavity mold and forming a sealed space between the molding surface of the cavity mold and the film, the film including a base film on which the decorative design layer is formed,
pushing a portion of the film toward the molding surface of the cavity mold using a movable member that is provided separately from the cavity mold and the core mold, the movable member including a pressing portion having a tip portion made of a soft material,
the tip portion of the pressing portion pushing the portion of the film toward the molding surface of the cavity mold by the movable member moving separately from the cavity mold and the core mold, and subsequently the tip portion of the pressing portion pressing the portion of the film against the projection on the molding surface of the cavity mold, the tip portion of the pressing member comprising an elastic material which limits movement of the portion of the film being pressed against the projection on the molding surface of the cavity mold by elastic deformation;
while the mold remains open, sticking the film onto a molding surface of the cavity mold by vacuum suction to decrease pressure in the sealed space sealed between the molding surface of the cavity mold and the film and shaping the film to conform to the molding surface;
withdrawing the movable member to a position outside the mold; and
clamping the mold and injecting molten plastic into a cavity defined between the film and the core surface of the core mold and molding the article, resulting in the decorative design layer of the film sticking to the design surface of the article body.

8. The method for manufacturing a decorative molded article according to claim 7, wherein:
the decorative design layer includes a plurality of design portions having a boundary portion between adjacent design portions, and
the pressing by the tip portion of the pressing portion is performed at the boundary portion between the adjacent design portions.

\* \* \* \* \*